3,322,801
METHOD OF PREPARING NOVEL ORGANOTIN COMPOUNDS
Albert K. Sawyer, Durham, N.H., assignor to M&T Chemicals Inc., New York, N.Y., a corporation of Delaware
No Drawing. Filed July 31, 1963, Ser. No. 299,105
11 Claims. (Cl. 260—429.7)

This invention relates to a novel process for the manfacture of organotin compounds.

According to certain of its aspects, the method of this invention for preparing compounds $(R_aSnSnR'_a)_x$ comprises reacting as reactants equivalent proportions of $R_aSnH_{4-a}$ and $R'_aSnY_{4-a}$ wherein Y is a proton acceptor selected from the group consisting of ½O, OH, and OR''; R, R', and R'' are each a hydrocarbon radical, free of olefinic and acetylenic unsaturation, selected from the group consisting of alkyl, alkaryl, aralkyl, aryl, and cycloalkyl radicals, $a$ is an integer greater than 1 and less than 4, $x$ is 1 when $a$ is 3, and 2–5 when $a$ is 2, maintaining said reactants together in a reaction mixture, and separating $(R_aSnSnR'_a)_x$.

The reactant $R_aSnH_{4-a}$ may be one wherein R may be a hydrocarbon radical selected from the group consisting of alkyl, alkaryl, aralkyl, aryl, and cycloalkyl. When R is alkyl, it may include methyl, ethyl, n-propyl, isopropyl, n-butyl, amyls, octyls, etc. When the R is alkaryl, it may include tolyl, xylyl, etc. When the R is aralkyl, it may include benzyl, ω-phenylpropyl, etc. When the R is aryl, it may include phenyl, etc. When R is cycloalkyl, it may include cyclohexyl, cycloheptyl, etc. Groups which are inertly substituted may be employed. The preferred group may be n-butyl.

In the compound $R_aSnH_{4-a}$, $a$ may be an integer greater than 1 and less than 4, e.g. 2 or 3. When $a$ is 2, the compound may be $R_2SnH_2$. When $a$ is 3, the compound may be $R_3SnH$. When the compound is $R_2SnH_2$, typical preferred compounds, made by well known techniques, may include:

dimethyltin dihydride
diethyltin dihydride
di-n-propyltin dihydride
di-n-butyltin dihydride
di-isobutyltin dihydride
di-n-octyltin dihydride
diphenyltin dihydride
dibenzyltin dihydride
di-o-tolyltin dihydride
dicyclohexyltin dihydride.

When the compound is $R_3SnH$, typical preferred compounds, made by well known techniques, may include:

trimethyltin hydride
triethyltin hydride
tri-n-propyltin hydride
tri-n-butyltin hydride
tri-n-octyltin hydride
triphenyltin hydride
tribenzyltin hydride
tri-n-amyltin hydride
tri-o-tolyltin hydride
tricyclohexyltin hydride.

The reactant $R'_aSnY_{4-a}$ is preferably one wherein R' is a hydrocarbon radical selected from the group consisting of alkyl, alkaryl, aralkyl, anyl, and cycloalkyl. When R' is alkyl, it may include methyl, ethyl, n-propyl, isopropyl, n-butyl, amyls, octyls, etc. When the R' is alkaryl, it may include tolyl, xylyl, etc. When the R' is aralkyl, it may include benzyl, ω-phenylpropyl, etc. When the R' is aryl, it may include phenyl, etc. When R' is cycloalkyl, it may include cyclohexyl, cycloheptyl, etc. Groups which are inertly substituted may be employed. The preferred group may be n-butyl.

In the reactant $R'_aSnY_{4-a}$, Y is a proton acceptor selected from the group consisting of oxygen, ½O, the hydroxyl group, —OH, and the group OR''. R'' may be selected from the same group as R and R'. Preferably R'' may be methyl and ethyl. It will be apparent that when the proton acceptor is oxygen and $a$ is 3, the compound may be of the form $R'_3SnOSnR'_3$. When Y is oxygen and $a$ is 2, the composition $R'_aSnY_{4-a}$ may alternatively be of the form $R'_2SnO$. Illustrative compounds of these two types may be bis(tri-n-butyltin)oxide and di-n-butyltin oxide. For purpose of convenience, a dihydroxide is considered to be equivalent to an oxide. When $a$ is 2, the compound may be $R'_2SnY_2$, and typical preferred compounds may include:

dimethyltin oxide
di-n-butyltin oxide
diphenyltin oxide
dicyclohexyltin oxide
di-n-propyltin oxide
dibenzyltin oxide
butyl,phenyltin oxide
dioctyltin oxide
dinaphthyltin oxide
didodecyltin oxide
dimethytin dimethoxide
di-n-butyltin dimethoxide
diphenyltin dimethoxide
dibutyltin diphenoxide
diphenyltin diethoxide
di-n-butyltin diethoxide.

When $a$ is 3, the compound my be $R'_3SnY$, and typical preferred compounds may include:

trimethyltin hydroxide
triethyltin hydroxide
tri-n-propyltin hydroxide
triphenyltin hydroxide
tricyclohexyltin hydroxide
bis(tri-n-butyltin) oxide
bis(tribenzyltin) oxide
bis(triphenyltin) oxide
tri-n-propyltin methoxide
tri-n-octyltin methoxide
tri-n-butyltin cyclohexoxide
tri-n-butyltin methoxide.

In practice of the process of this invention, the reactants may be mixed together to form the reaction mixture, preferably in equivalent proportions. Typically the reactants are liquids which may be readily miscible. In some cases, one reactant e.g. dibutyltin oxide or diphenyltin oxide, may be a solid.

It may be desirable to use in the reaction mixture an inert diluent. Preferably the reactants may be soluble in or compatible with the inert diluent. Typical inert diluents may include inert hydrocarbons such as aromatic hydrocarbons including benzene, toluene, etc. or aliphatic hydrocarbons including hexane, heptane, octane, etc. Preferably the solvent may be one which has a boiling point at atmospheric pressure of at least about 100° C. and typically 100° C.–200° C.

The solvent may preferably be employed when the reactant $R'_aSnY_{4-a}$ may be one wherein Y is oxide or hydroxide. It is however a particular feature of this process that it may be carried out without solvent.

The reaction of this invention is preferably carried out under inert atmosphere e.g. nitrogen, since many of the raw materials e.g. hydrides, or polytin products e.g. ditins may be oxidized by oxygen.

In carrying out the novel reaction, the reaction mixture may be maintained at 20° C.–200° C., preferably 100° C.–120° C for 5 minutes to 24 hours. When one of the reactants, $R'_aSnY_{4-a}$, is a compound wherein Y is OR'', e.g. an alkoxide, the reaction may occur e.g. at room temperature of 20° C. in about 24 hours. In this case however, as for the case where Y is oxygen or hydroxide, it is preferred to heat the reaction mixture to 100° C.–120° C. as by a steam bath, for typically 5 minutes to 16 hours.

When the reaction is carried out in the presence of inert diluent, it may be carried out at reflux temperature of the diluent, typically 80° C.–200° C., say 111° C. for the preferred diluent, toluene.

During this period, the following reaction may occur:

$$R_aSnH_{4-a} + R'_aSnY_{4-a} \rightarrow (R_aSnSnR'_a)_x + HY$$

Typically, the reaction may be as follows:

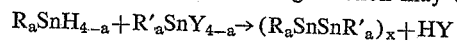
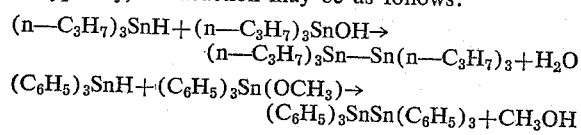

$(C_6H_{11})_2SnH_2 + (C_6H_{11})_2SnO \rightarrow$
$\quad\quad [(C_6H_{11})_2Sn-Sn(C_6H_{11})_2]_x + H_2O$ $(n-C_3H_7)_2SnH_2 + (n-C_3H_7)_2Sn(OC_2H_5)_2 \rightarrow$
$\quad\quad [(n-C_3H_7)_2Sn-Sn(C_3H_7)_2]_x + 2C_2H_5OH$ When the reaction is conducted at temperature above the effective boiling point of the by-product, e.g. water or alcohol, the by-product may be recovered as distillate—either alone or as an azeotrope with the inert diluent. When the reaction is conducted at low temperature e.g. 20° C.–100° C., the by-product may be removed as by distillation at vacuum of e.g. 1–20 mm. Hg.

At the end of the reaction time, after the by-product has been removed, the reaction mixture may contain pure product or pure product together with diluent. Where the pure product is obtained as residue, it may be separated or withdrawn i.e. recovered as such or further purified. where the pure product is present together with diluent, the product (if insoluble in the diluent) may be filtered, washed, and further purified if desired. If the pure product is soluble in the diluent, it may be employed as is or the solvent may be separated as by distillation under reduced pressure.

In all cases, the product may be obtained in substantially stoichiometric yields in high purity.

For purpose of giving those skilled in the art a better understanding of the invention, reference will be made to the following examples wherein all parts by weight unless otherwise stated. In order to clearly demonstrate the effect of the radical Y of the compound $R'_aSnY_{4-a}$ in the illustrative reactions, the radicals $R'$ and $R$ may be maintained constant.

*Example 1*

$2Bu_3SnH + (Bu_3Sn)_2O \rightarrow 2Bu_3SnSnBu_3 + H_2O$

Into a reaction vessel maintained under an atmosphere of nitrogen, there may be introduced 48 parts (0.2 mole) of tri-n-butyltin hydride and 60 parts (0.1 mole) of bis(tri-n-butyltin) oxide. The reaction mixture may be heated by steam to approximately 100° C. for 48 hours during which time a flow of nitrogen gas may be maintained to the reaction vessel. During the reaction, essentially no evolution of gas may be noted, but nitrogen gas leaving the reaction vessel contained water which may be condensed. 1.8 parts (0.1 mole) of water may be recovered. The residue in the reaction vessel may be 116 parts of hexabutylditin—substantially 100% yield. This product may be distilled at reduced pressure of 1 mm. Hg to yield a colorless liquid which analyzed 40.3% Sn (theory 40.92%). The molecular weight (as determined by osmometric technique in toluene) was 597—theory 580.1. When tested by the standard bromine titration test, the product may consume 100% of the theoretical amount of bromine, thus indicating that it contains one Sn—Sn bond per molecule of product.

*Example 2*

$Bu_2SnH_2 + Bu_2SnO \rightarrow (Bu_2Sn)_x + H_2O$

Into a reaction vessel maintained under an atmosphere of nitrogen, there may be introduced 47.0 parts (0.2 mole) of di-n-butyltin hydride and 49.8 parts (0.2 mole) of di-n-butyltin oxide. The reaction mixture may be heated by steam to approximately 100° C. for 12 hours during which time a flow of nitrogen gas may be maintained to the reaction vessel. The mixture may become clear after 8 hours indicating that all the di-n-butyltin oxide reacted. During the reaction, no evolution of gas may be noted, but nitrogen gas leaving the reaction vessel contained water which may be condensed. 3.6 parts (0.2 mole) of water may be recovered. The residue in the reaction vessel may be 83 parts of di-n-butyltin as a viscous yellow-green liquid—substantially 100% yield. On oxidation by air to dibutyltin oxide, the product analyzed 47.73% Sn—theory 47.69%.

*Example 3*

$Bu_2SnH_2 + Bu_2SnO \rightarrow (Bu_2Sn_2)_x + H_2O$

Into a reaction vessel equipped with a stirrer, reflux condenser, Dean-Stark trap, and nitrogen inlet, there may be introduced 86 parts of toluene, 23.5 parts (0.1 mole) of di-n-butyltin dihydride, and 24.9 parts (0.1 mole) of di-n-butyltin oxide. The reaction mixture, maintained under an atmosphere of nitrogen, may be heated to reflux (approximately 111° C.) during which time a flow of nitrogen gas may be maintained to the reaction vessel. After about 8 hours, the originally cloudy mixture may become clear. 1.8 parts of water (0.1 mole) may be collected in the trap. Refluxing may be continued for an additional 4 hours to insure completion of the reaction. The reflux condenser may then be replaced by a distillation condenser and the toluene stripped off at vacuum of 20 mm. Hg. At the conclusion of the stripping, the reaction vessel contains a viscous yellow-green liquid, di-n-butyltin, in quantitative yield. The properties of this material may be the same as those of the product obtained in Example 2.

*Example 4*

$Bu_2SnH_2 + Bu_2Sn(OMe)_2 \rightarrow (Bu_2Sn)_x + MeOH$

Into a reaction vessel maintained under an atmosphere of nitrogen there may be introduced 235 parts (1 mole) of di-n-butyltin dihydride and 295 parts (1 mole) of dibutyltin dimethoxide. The reaction mixture may be allowed to stand at room temperature of approximately 20° C.–25° C. for 30 hours during which time the flow of nitrogen gas may be maintained to the reaction vessel. During the reaction no evolution of gas may be noted. 32 parts of methanol may be recovered by distillation at 1 mm. Hg. The residue in the reaction vessel may be 233 parts of dibutyltin—substantially stoichiometric yield. The product may be converted to di-n-butyltin oxide by exposure to dry air for several days, and the oxide analyzed. It was found to contain 47.59% Sn (theory 47.69%).

*Example 5*

$Me_3SnOH + Bu_3SnH \rightarrow Me_3SnSnBu_3 + H_2O$

Into a reaction vessel maintained under an atmosphere of nitrogen there may be introduced 181 parts (1 mole) of trimethyltin hydroxide and 290 parts (1 mole) of tributyltin hydride. The reaction mixture may be heated by steam to approximately 100° C. for 48 hours during which time a flow of nitrogen gas may be maintained in the reaction vessel. During the reaction, no evolution of gas may be noted but nitrogen gas leaving the reaction vessel may contain water which may be condensed. 18 parts (1 mole) of water may be recovered. The residue in the reaction vessel may be 453 parts of trimethyl, tributylditin—in substantially 100% yield. This product may be obtained as a colorless liquid. The molecular weight (as determined by osmometric technique in toluene) was 404—theory 453.

As many embodiments of this invention may be made without departing from the spirit and scope thereof, it is to be understood that the invention includes all such modifications and variations as come within the scope of the appended claims.

I claim:

1. The method of preparing compounds $(R_aSnSnR'_a)_x$ which comprises reacting as reactants equivalent proportions of $R_aSnH_{4-a}$ and $R'_aSnY_{4-a}$ wherein Y is a portion acceptor selected from the group consisting of ½O, OH, and OR''; R, R', and R'' are each a hydrocarbon radical, free of olefinic and acetylenic unsaturation, selected from the group consisting of alkyl, alkaryl, aralkyl, aryl, and cycloalkyl; $a$ is an integer greater than 1 and less than 4, $x$ is 1 when $a$ is 3, and 2–5 when $a$ is 2; maintaining said reactants together in a reaction mixture; and separating $(R_aSnSnR'_a)_x$.

2. The method as claimed in claim 1 wherein $a$ is 2.

3. The method as claimed in claim 1 wherein $a$ is 3.

4. The method as claimed in claim 1 wherein said reactant $R_aSnH_{4-a}$ is tributyltin hydride.

5. The method as claimed in claim 1 wherein said reactant $R_aSnH_{4-a}$ is dibutyltin dihydride.

6. The method as claimed in claim 1 wherein R and R' are butyl.

7. The method as claimed in claim 1 wherein said reactants are maintained in a reaction mixture including an inert diluent.

8. The method as claimed in claim 1 wherein said reactants are maintained in a reaction mixture including an inert diluent at reflux temperature.

9. The method of preparing di-n-butyltin which comprises reacting as reactants equivalent proportions of dibuntyltin dihydride and dibutyltin dimethoxide, maintaining said reactants together in a reaction mixture, and separating di-n-butyltin.

10. The method of preparing hexa-n-butylditin which comprises reacting as reactants equivalent proportions of tributyltin hydride and bis(tri-n-butyltin) oxide, maintaining said reactants together in a reaction mixture, and separating hexa-n-butylditin.

11. The method of preparing di-n-butyltin which comprises reacting as reactants equivalent proportions of dibutyltin dihydride and dibutyltin oxide, maintaining said reactants together in a reaction mixture, and separating di-n-butyltin.

No references cited.

TOBIAS E. LEVOW, *Primary Examiner.*

E. C. BARTLETT, W. F. W. BELLAMY,
*Assistant Examiners.*